United States Patent
Hara et al.

(10) Patent No.: US 9,257,123 B2
(45) Date of Patent: Feb. 9, 2016

(54) VOCODER PROCESSING METHOD, SEMICONDUCTOR DEVICE, AND ELECTRONIC DEVICE

(71) Applicant: Renesas Mobile Corporation, Tokyo (JP)

(72) Inventors: Jiro Hara, Tokyo (JP); Yutaka Uchimura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 290 days.

(21) Appl. No.: 13/925,922

(22) Filed: Jun. 25, 2013

(65) Prior Publication Data

US 2014/0046657 A1 Feb. 13, 2014

(30) Foreign Application Priority Data

Aug. 8, 2012 (JP) .................... 2012-176254

(51) Int. Cl.
*G10L 19/00* (2013.01)
*G10L 21/00* (2013.01)
*G06F 9/24* (2006.01)
*G06F 12/08* (2006.01)

(52) U.S. Cl.
CPC . *G10L 19/00* (2013.01); *G06F 9/24* (2013.01); *G06F 12/0862* (2013.01); *G10L 21/00* (2013.01)

(58) Field of Classification Search
None
See application file for complete search history.

(56) References Cited

U.S. PATENT DOCUMENTS

| | | | |
|---|---|---|---|
| 5,784,532 A | 7/1998 | McDonough et al. | |
| 6,658,578 B1* | 12/2003 | Laurenti et al. | 713/324 |
| 6,732,235 B1* | 5/2004 | Krivacek et al. | 711/118 |
| 2004/0015923 A1* | 1/2004 | Hemsing et al. | 717/154 |
| 2006/0268777 A1* | 11/2006 | Schmidt | 370/329 |
| 2012/0215532 A1* | 8/2012 | Foo et al. | 704/235 |

FOREIGN PATENT DOCUMENTS

| | | |
|---|---|---|
| JP | 9-259040 A | 10/1997 |
| JP | 2003-216198 A | 7/2003 |

* cited by examiner

*Primary Examiner* — Daniel Abebe
(74) *Attorney, Agent, or Firm* — Shapiro, Gabor and Rosenberger, PLLC (57) ABSTRACT

In a semiconductor device, a vocoder processing unit requests, after executing a first vocoder process being one of an encoding process and a decoding process and before executing a following second vocoder process being other one of the encoding process and the decoding process, a cache memory to prefetch first program data to be used for the second vocoder process from an external memory.

20 Claims, 8 Drawing Sheets

VOCODER PROCESSING METHOD, SEMICONDUCTOR DEVICE, AND ELECTRONIC DEVICE

CROSS-REFERENCE TO RELATED APPLICATIONS

This application is based upon and claims the benefit of priority from Japanese patent application No. 2012-176254, filed on Aug. 8, 2012, the disclosure of which is incorporated herein in its entirety by reference.

BACKGROUND

The present invention relates to a vocoder processing method, a semiconductor device and an electronic device.

In recent years, a wireless communication terminal that transmits and receives voice as a digital signal includes a vocoder processing unit (vocoder), which encodes a voice signal to be transmitted and decodes a received voice signal. For example, Japanese Unexamined Patent Application Publication No. 2003-216198 discloses an ASIC (Application Specific Integrated Circuit) for a vocoder process.

Meanwhile, Japanese Unexamined Patent Application Publication No. 9-259040 discloses a technique relating to an improvement in the hit rate of a cache memory (cache hit rate).

SUMMARY

In developing a semiconductor device used for communication terminals and the like, the inventors of the present invention have found various problems. Each embodiment disclosed herein presents a semiconductor device suitable for a communication terminal and the like, for example.

Other problems and novel characteristics will become apparent from the description of the present specification and the accompanying drawings.

A semiconductor device according to one embodiment includes a vocoder processing unit that requests a prefetch of program data.

According to one embodiment, a semiconductor device of excellent quality suitable for, for example, wireless communication terminals and the like can be provided.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

In the following, a specific embodiment will be explained in detail with reference to the drawings. Note that the present invention is not limited to the following embodiment. Further, in order to provide a clear explanation, the following description and drawings are simplified as appropriate.

<Structure of Semiconductor Device According to First Comparative Example>

Figure 1:
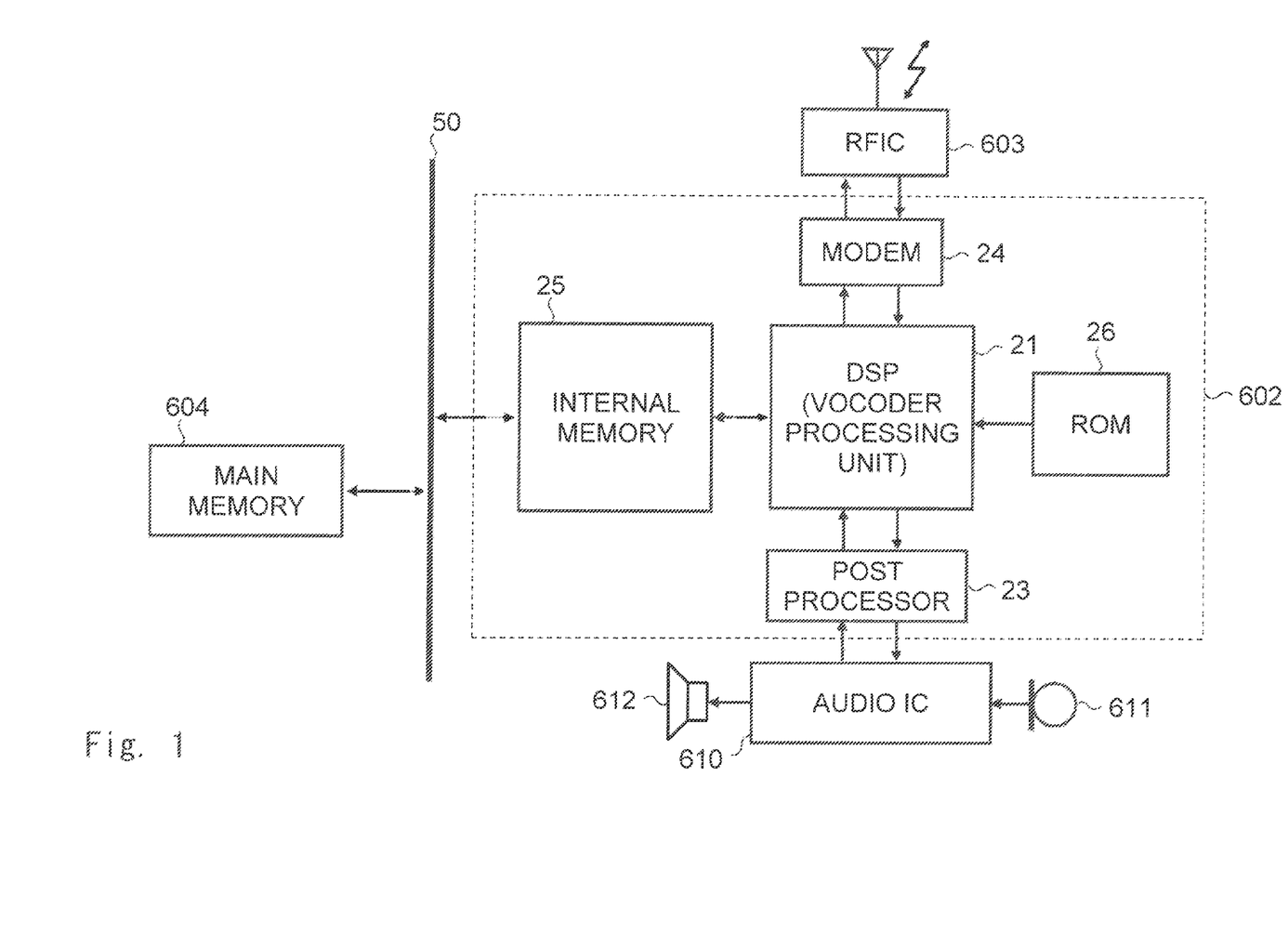
FIG. 1 is a block diagram showing an exemplary structure of a baseband processor 602, which is the semiconductor device according to the first comparative example.

Firstly, with reference to FIG. 1, an explanation will be given of a semiconductor device according to a first comparative example considered by the inventors of the present invention. FIG. 1 is a block diagram showing an exemplary structure of a baseband processor 602, which is the semiconductor device according to the first comparative example. FIG. 1 shows the internal structure of the baseband processor 602 according to the first comparative example, function blocks (an RFIC 603, a main memory 604, an audio IC 610, a microphone 611, and a speaker 612) around the baseband processor 602 and a bus 50. The baseband processor 602 is used for, for example, a wireless communication device such as a mobile phone.

As shown in FIG. 1, the baseband processor 602 according to the first comparative example includes a DSP (Digital Signal Processor) 21, a post-processor (voice processing unit) 23, a modem 24, an internal memory 25, and a ROM (Read Only Memory) 26.

The DSP 21 performs a vocoder process (an encoding process and a decoding process) to voice data to be transmitted and voice data received, based on a program for a vocoder process stored in the ROM 26. That is, the DSP 21 receives transmission voice data from the post-processor 23 and performs an encoding process to the received transmission voice data, and transmits the encoded voice data to the modem 24. On the other hand, the DSP 21 receives demodulated reception voice data from the modem 24 and performs a decoding process to the received reception voice data, and transmits the decoded reception voice data to the post-processor 23.

The post-processor 23 performs voice processing such as noise cancellation, echo cancellation and the like to the voice data received from the audio IC 610, and transmits the processed voice data to the DSP 21. On the other hand, the post-processor 23 performs voice processing such as noise cancellation, echo cancellation and the like to the voice data received from the DSP 21, and transmits the processed voice data to the audio IC 610.

The modem 24 performs a modulation process and a demodulation process to data transmitted and data received by the baseband processor 602. Specifically, the modem 24 performs a modulation process to transmission voice data received from the DSP 21 by carrier waves, and transmits the modulated transmission voice data to the RFIC 603. On the other hand, the modem 24 performs a demodulation process to reception voice data received from the RFIC 603 by carrier waves, and transmits the demodulated reception voice data to the DSP 21.

The internal memory 25 serves as the working memory when the DSP 21 performs a vocoder process. The internal memory 25 has a capacity of, for example, about 300 kB.

The ROM 26 stores the entire program for a vocoder process. The ROM 26 has a capacity of, for example, about 200 kB. Note that the main memory 604 does not store any program for a vocoder process.

Thus, with the first comparative example, since the program for a vocoder process is stored in the ROM 26, there is a problem that the program cannot be rewritten, and a new program cannot be addressed.

Further, since the total capacity of the internal memory 25 and the ROM 26 is about several hundred kB, there is a problem that the semiconductor device is increased in size.

<Structure of Semiconductor Device According to Second Comparative Example>

Figure 2:
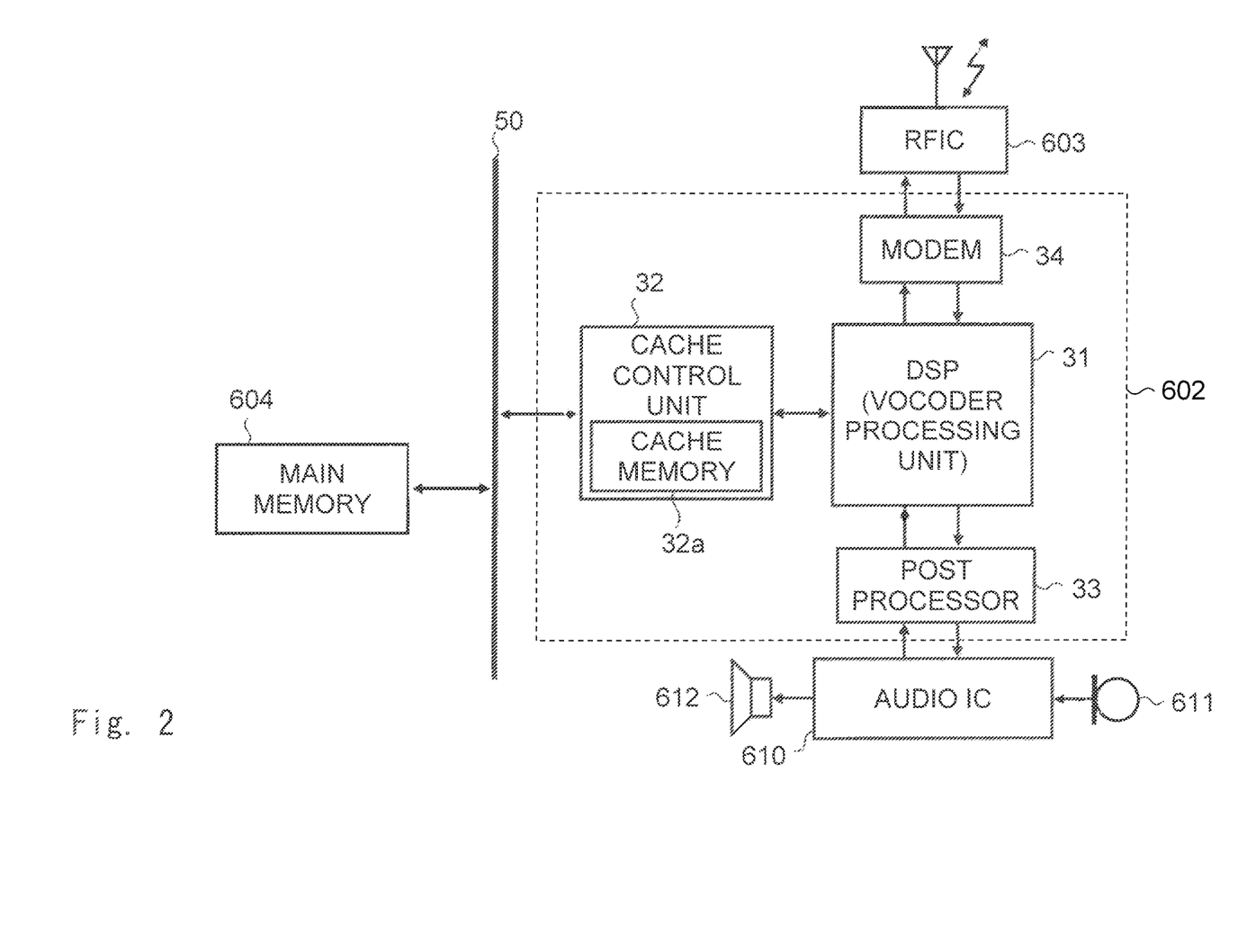
FIG. 2 is a block diagram showing an exemplary structure of a baseband processor 602, which is the semiconductor device according to the second comparative example.

Next, with reference to FIG. 2, an explanation will be given of a semiconductor device according to a second comparative example, which is considered by the inventors of the present invention in order to solve the problems noted above. FIG. 2 is a block diagram showing an exemplary structure of a baseband processor 602, which is the semiconductor device according to the second comparative example. FIG. 2 shows the internal structure of the baseband processor 602 according to the second comparative example, function blocks (an RFIC 603, a main memory 604, an audio IC 610, a microphone 611, and a speaker 612) around the baseband processor 602 and a bus 50.

As shown in FIG. 2, the baseband processor 602 according to the second comparative example includes a DSP (Digital Signal Processor) 31, a cache control unit 32, a post-processor (voice processing unit) 33, and a modem 34. Here, the cache control unit 32 includes a cache memory 32a.

The baseband processor 602 according to the second comparative example shown in FIG. 2 includes the cache control unit 32 (cache memory 32a) in place of the internal memory 25 and the ROM 26 shown in FIG. 1. That is, in the second comparative example, the main memory 604 stores the entire program for a vocoder process. Then, a vocoder process is performed by the cache memory 32a by temporarily retrieving part of the program.

The DSP 31 performs a vocoder process based on the program data for a vocoder process (part of the entire program stored in the main memory 604) retained in the cache memory 32a. In this manner, in the second comparative example, since the cache control unit 32 (cache memory 32a) is employed in place of the internal memory 25 and the ROM 26 according to the first comparative example, the problems noted above can be solved.

Here, when the DSP 31 accesses the cache control unit 32, if the program data for the vocoder process to be executed is retained in the cache memory 32a (that is, if it is a cache hit), then the vocoder process can be performed with very little delay (for example, with a delay of about one or two clock cycles).

However, when the DSP 31 accesses the cache control unit 32, if the program data used for the vocoder process to be executed is not retained in the cache memory 32a (that is, if it is a cache miss), then the program data must be read from the main memory 604 via the bus 50. Therefore, a delay of about tens of clock cycles occurs.

Note that, when the DSP 31 accesses the main memory 604 upon a cache miss, if other function block is accessing the main memory 604, the delay becomes greater. For example, since calls with a mobile phone require high real-time performance, such a delay is disadvantageous.

<Operation of Semiconductor Device According to Second Comparative Example>

Figure 3:
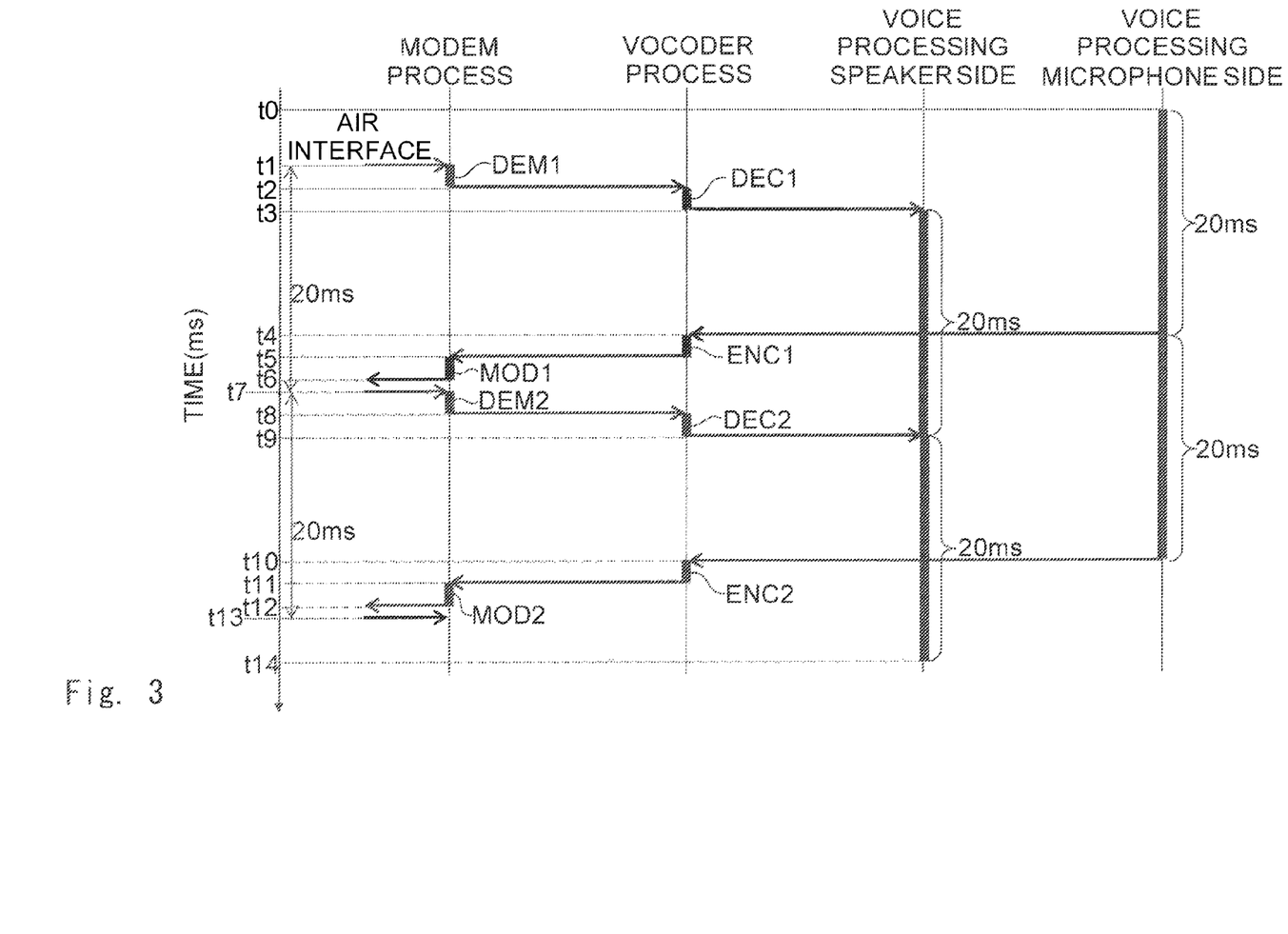
FIG. 3 is a timing chart for explaining the operation of the semiconductor device according to the second comparative example.

With reference to the timing chart of FIG. 3, an explanation will be given of the operation of the semiconductor device according to the second comparative example shown in FIG. 2. FIG. 3 is a timing chart for explaining the operation of the semiconductor device according to the second comparative example. The vertical axis shown on the very left side in FIG. 3 indicates time (ms). In the drawing, time elapses from the top side toward the bottom side. Further, four vertical lines being parallel to the vertical axis (time axis) indicate four processes, namely, a modem process, a vocoder process, voice processing (speaker side), and voice processing (microphone side), in order from the left side in the drawing. Further, single-headed arrows in the drawing represent flows of data. Double-headed arrows represent time sections.

At time point t1, the modem 34 receives a reception voice signal from the air interface.

Between time points t1 and t2, the modem 34 executes a first demodulation process DEM1 to the reception voice signal ("MODEM PROCESS" in FIG. 3).

At time point t2, the DSP 31 receives the reception voice signal demodulated by the modem 34.

Between time points t2 and t3, the DSP 31 executes a first decoding process DEC1 ("VOCODER PROCESS" in FIG. 3).

At time point t3, the post-processor 33 receives the reception voice signal decoded by the DSP 31.

Between time points t3 and t9 spanning 20 ms, the post-processor 33 executes voice processing such as noise cancellation, echo cancellation and the like to the reception voice signal ("VOICE PROCESSING SPEAKER SIDE" in FIG. 3). The reception voice signal having undergone the voice processing is transmitted to the speaker 612 via the audio IC 610.

On the other hand, between time points t0 and t4 spanning 20 ms, the post-processor 33 executes voice processing such as noise cancellation, echo cancellation and the like to a transmission voice signal ("VOICE PROCESSING MICROPHONE SIDE" in FIG. 3). Note that the transmission voice signal is generated by the audio IC 610 from the voice detected by the microphone 611.

At time point t4, the DSP 31 receives the transmission voice signal having been subjected to the voice processing by the post-processor 33.

Between time points t4 and t5, the DSP 31 executes a first encoding process ENC1 ("VOCODER PROCESS" in FIG. 3).

At time point t5, the modem 34 receives the transmission voice signal encoded by the DSP 31.

Between time points t5 and t6, the modem 34 executes a first modulation process MOD1 to the transmission voice signal (see "MODEM PROCESS" in FIG. 3).

At time point t6, the transmission voice signal modulated by the modem 34 is transmitted to the air interface.

Then, at time point t7, the modem 34 again receives a reception voice signal from the air interface. In this manner, the procedure from time points t1 to t7 (cycle time 20 ms) is repetitively executed. For example, between time points t7 and t13 also, the procedure that is similar to the procedure performed between time points t1 and t7 is repeated. Note that the detailed operation from time point t7 onward will not be explained.

As shown in FIG. 3, in a prescribed (e.g., 20 ms) cycle time, the reception voice signal is decoded (e.g., DEC1) and the transmission voice signal is encoded (e.g., ENC1). In the semiconductor device according to the second comparative example, when the capacity of the cache memory 32a is reduced, the cache hit rate is also reduced. As a result, there is a problem that, upon a cache miss, the vocoder process does not complete within the cycle time (that is, the vocoder process delays).

Aiming to solve the problems associated with the first and second comparative examples the same time, the inventors of the present invention studied the structure and operation of a semiconductor device that can achieve both a reduction in size of the semiconductor device and acceleration of a vocoder process. More precisely, the inventors studied the structure and operation of a semiconductor device with which an improvement of the cache hit rate (a reduction in the cache miss rate) can be achieved, despite the fact that miniaturization of the semiconductor device is achieved by employing the cache memory similarly to the second comparative example. A detailed explanation thereof will be given in the following.

First Embodiment

Overview of Wireless Communication Terminal

Figure 4A:
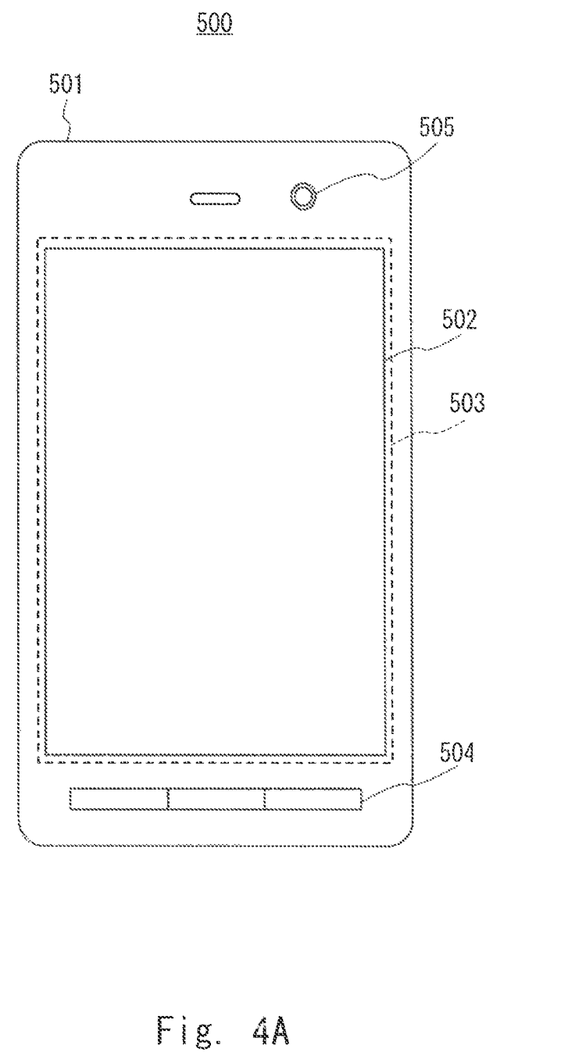
FIG. 4A is an exterior view showing an exemplary structure of a wireless communication terminal 500.
Figure 4B:
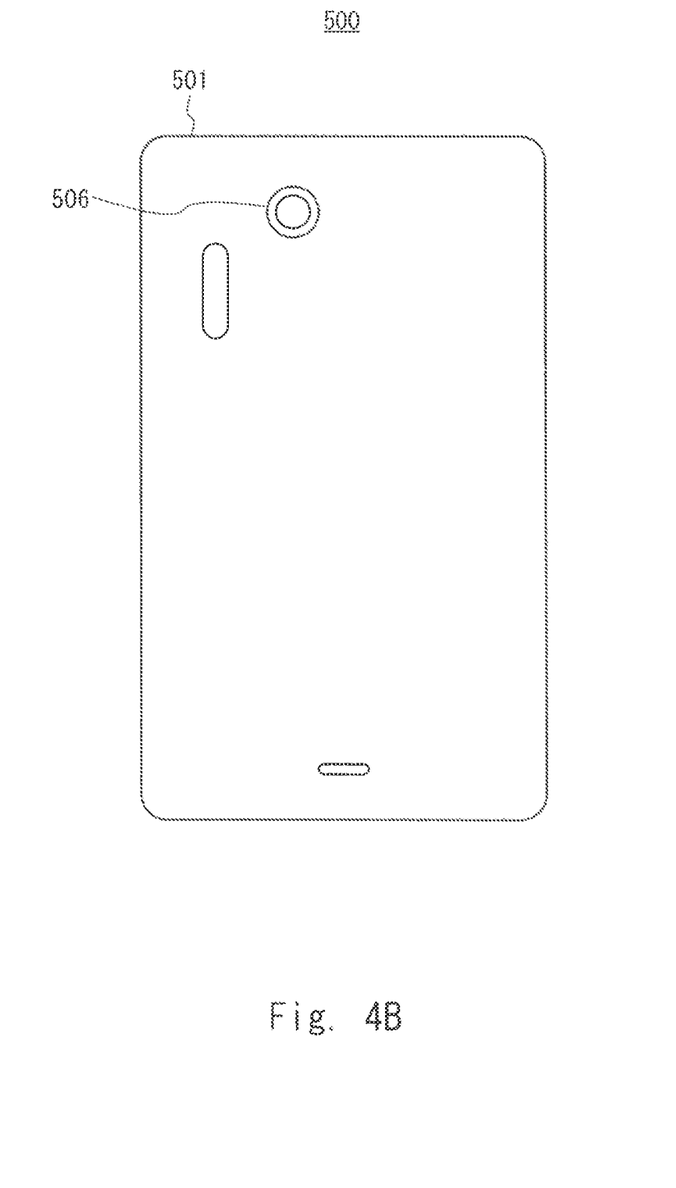
FIG. 4B is an exterior view showing an exemplary structure of a wireless communication terminal 500.

Firstly, with reference to FIGS. 4A and 4B, an explanation will be given of the overview of a wireless communication terminal suitable as an electronic device to which a semiconductor device according to the present embodiment is applied. FIGS. 4A and 4B are each an exterior view showing an exemplary structure of a wireless communication terminal 500.

Note that, FIGS. 4A and 4B each show the case where the wireless communication terminal 500 is a smartphone. However, the wireless communication terminal 500 may be other wireless communication terminal such as a feature phone (e.g., a flip mobile phone terminal), a portable game terminal, a tablet PC (Personal Computer), and a notebook PC and the like. Needless to say, the semiconductor device according to the present embodiment is applicable to any device other than wireless communication terminals.

FIG. 4A shows one main surface (front face) of a housing 501 that forms the wireless communication terminal 500. On the front face of the housing 501, a display device 502, a touch panel 503, a plurality of operation buttons 504, and a camera device 505 are disposed. On the other hand, FIG. 4B shows other main surface (back face) of the housing 501. On the back face of the housing 501, a camera device 506 is disposed.

The display device 502 is a display device such as a liquid crystal display (LCD: Liquid Crystal Display), an organic EL display (OLED: Organic Light-Emitting Diode) and the like. The display device 502 is disposed such that the displaying face is positioned on the front face of the housing 501.

The touch panel 503 is disposed so as to cover the displaying face of the display device 502. Alternatively, it is disposed on the back side of the display device 502. The touch panel 503 senses the position on the displaying face touched by the user. That is, the user can intuitively operate the wireless communication terminal 500 by touching the displaying face of the display device 502 with the finger, a dedicated pen (generally referred to as a stylus) and the like.

The operation buttons 504 are used for auxiliary operating the wireless communication terminal 500. Note that such operation buttons may not be provided depending on wireless communication terminals.

The camera device 505 is a sub-camera whose lens unit is positioned on the front face of the housing 501. Note that such a sub-camera may not be provided depending on wireless communication terminals.

The camera device 506 is a main camera whose lens unit is positioned on the back face of the housing 501.

<Structure of Wireless Communication Device>

Figure 5:
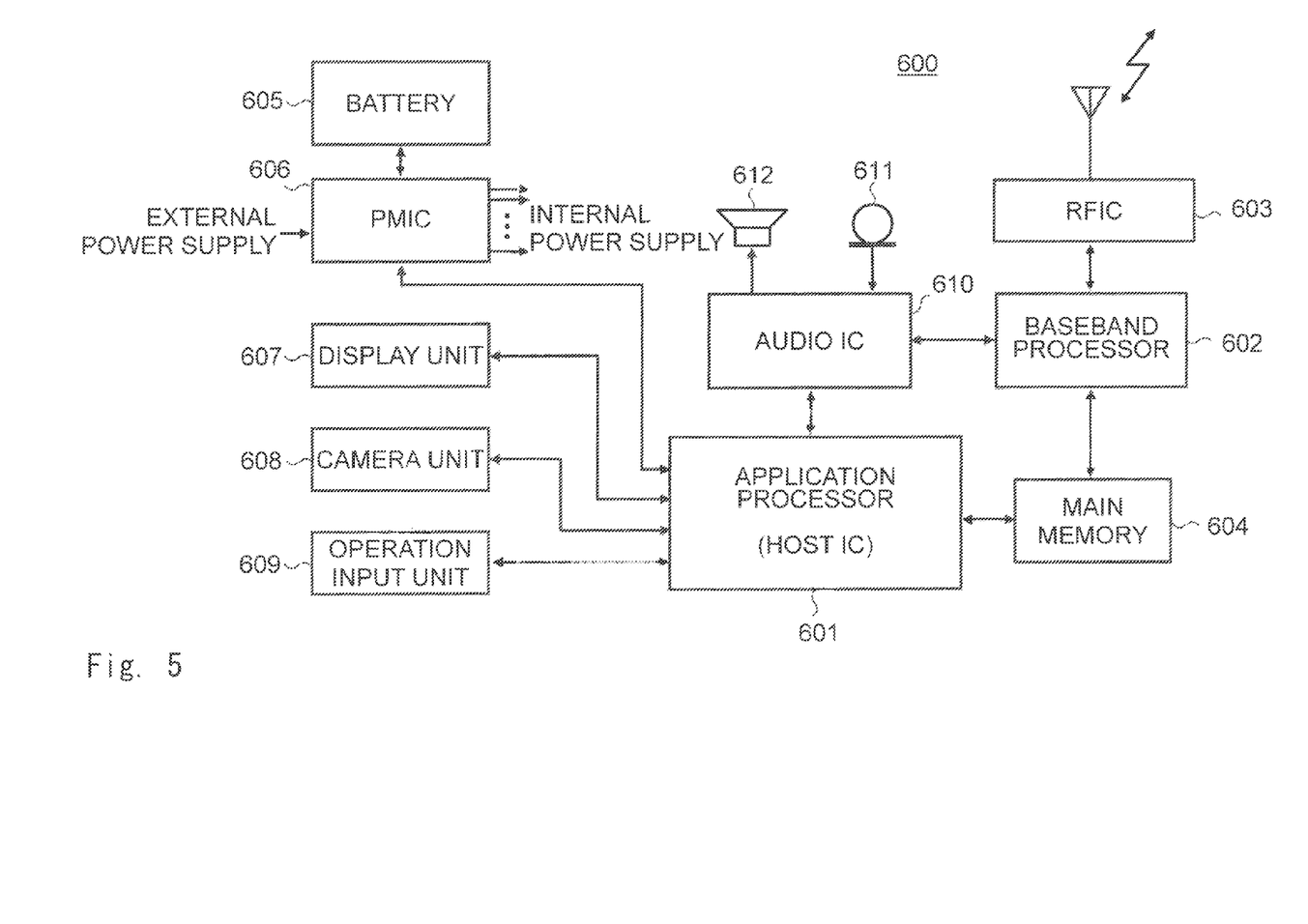
FIG. 5 is a block diagram showing an exemplary structure of the wireless communication device 600 according to the first embodiment.

With reference to FIG. 5, an explanation will be circa of the structure of a wireless communication device 600 in which the semiconductor device according to the present embodiment is installed. FIG. 5 is a block diagram showing an exemplary structure of the wireless communication device 600 according to the first embodiment. The wireless communication device 600 is, for example, the internal structure of the wireless communication terminal 500 shown in the FIGS. 4A and 4B. As shown in FIG. 5, the wireless communication device 600 includes an application processor (host IC) 601, a baseband processor 602, an RFIC (Radio Frequency Integrated Circuit) 603, a main memory 604, a battery 605, a power management IC (PMIC: Power Management Integrated Circuit) 606, a display unit 607, a camera unit 608, an operation input unit 609, an audio IC 610, a microphone 611, and a speaker 612.

The application processor (host IC) 601 is a semiconductor integrated circuit that reads programs stored in the main memory 604 to carry out processing for implementing various functions of the wireless communication device 600. For example, the application processor 601 reads an OS (Operating System) program from the main memory 604 and executes the same, and executes any application program that operates on the OS program.

The baseband processor 602 subjects data transmitted and received by the mobile communication terminal to baseband processing, which includes an encoding process (e.g., error correction coding of convolution codes, turbo codes and the like), a decoding process and the like.

Particularly as to voice data, the baseband processor 602 receives transmission voice data from the audio IC 610 and performs an encoding process to the received transmission voice data, and transmits the encoded transmission voice data to the RFIC 603. More specifically, the baseband processor 602 performs an encoding process to PCM data received from the audio IC 610, such that the PCM data is converted into AMR data that can be received by the RFIC 603.

On the other hand, the baseband processor 602 receives reception voice data from the RFIC 603 and performs a decoding process to the received reception voice data, and transmits the decoded reception voice data to the audio IC 610. More specifically, the baseband processor 602 performs a decoding process to AMR data, which is the reception voice data demodulated by the RFIC 603, such that the AMR data is converted into PCM data. Note that the AMR data is compressed data and the PCM data is uncompressed data.

The RFIC 603 performs analog RF signal processing. The analog RF signal processing includes frequency upconversion, frequency downconversion, amplification and the like.

Particularly as to voice data, the RFIC 603 generates a transmission RF signal from transmission voice data modulated by the baseband processor 602, and transmits the transmission RF signal via an antenna in a wireless manner (Up Link).

On the other hand, the RFIC 603 receives a reception RF signal via the antenna in a wireless manner and generates reception voice data from the reception RF signal, and transmits the generated reception voice data to the baseband processor 602 (Down Link).

The main memory (external memory) 604 stores programs and data that are used by the application processor 601. Further, the main memory 604 stores the program that is used for a vocoder process performed by the baseband processor 602, that is, a codec. A volatile memory such as a DRAM (Dynamic Random Access Memory) is frequently used as the main memory 604. Stored data in a volatile memory is cleared when power supply is shut down. Needless to say, a non-volatile memory that retains stored data even when power supply is shut down may be used as the main memory 604.

The battery 605 is an electric battery, and used when the wireless communication device 600 operates independently of an external power supply. Note that the wireless communication device 600 may be supplied with power from the battery 605 even when it is connected to any external power supply. Further, it is preferable to use a secondary battery as the battery 605.

The power management IC 606 generates an internal power supply from the battery 605 or an external power supply. This internal power supply is supplied to each of the blocks in the wireless communication device 600. Here, the power management IC 606 controls the voltage of the internal power supply for each block supplied with the internal power supply. The power management IC 606 performs the voltage control for the internal power supply based on instructions from the application processor 601. Further, the power management IC 606 can control supplying and blocking of the internal power supply for each block. In addition, the power management IC 606 also performs charging control for the battery 605 when supply from the external power supply is available.

The display unit 607 corresponds to the display device 502 shown in FIGS. 4A and 4B, and is a display device such as a liquid crystal display (LCD: Liquid Crystal Display), an organic EL display (OLED: Organic Light-Emitting Diode) and the like. The display unit 607 displays various images in accordance with processes performed by the application processor 601. The images displayed on the display unit 607 include user-interface images with which the user provides operation instructions to the wireless communication device 600, camera images, moving images and the like.

The camera unit 608 acquires an image in accordance with an instruction from the application processor 601. The camera unit 608 corresponds to the camera devices 505 and 506 in FIGS. 4A and 4B.

The operation input unit 609 is a user interface for the user to operate to provide an operation instruction to the wireless communication device 600. The operation input unit 609 corresponds to the touch panel 503 and the operation buttons 504 shown in FIGS. 4A and 4B.

The audio IC 610 converts reception voice data, which is a digital signal received from the baseband processor 602, into an analog signal, and drives the speaker 612. Thus, voice is output from the speaker 612.

On the other hand, the audio IC 610 subjects voice, which is an analog signal detected by the microphone 611, to an analog-to-digital (A/D) conversion, and outputs the converted signal to the baseband processor 602. More specifically, the audio IC 610 generates PCM data, which is a digital signal, from voice which is an analog signal.

<Structure of Semiconductor Device According to First Embodiment>

Figure 6:
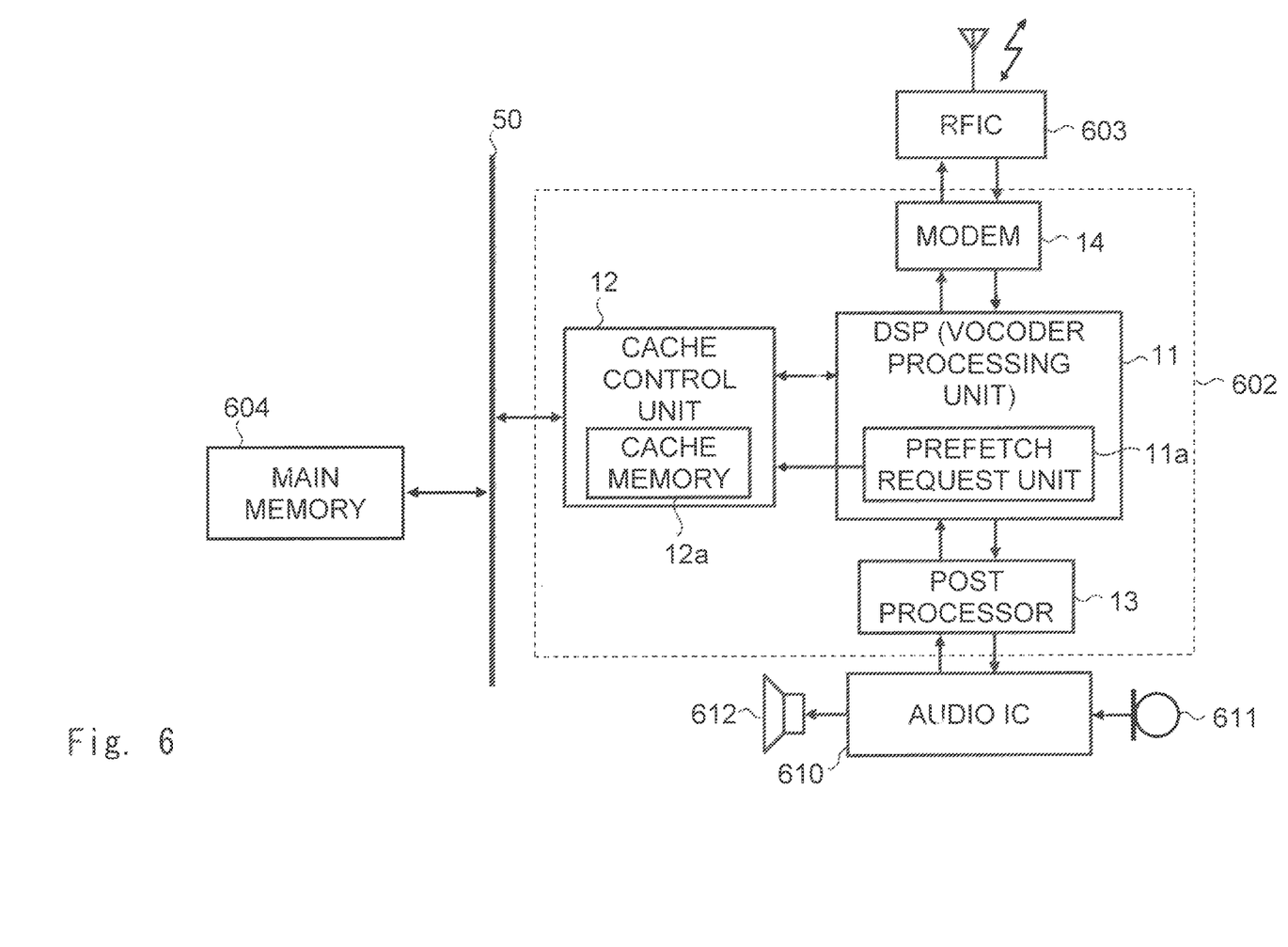
FIG. 6 is a block diagram showing an exemplary structure of the baseband processor 602 according to the first embodiment.

With reference to FIG. 6, an explanation will be given of the baseband processor 602, which is the semiconductor device according to the present embodiment, FIG. 6 is a block diagram showing an exemplary structure of the baseband processor 602 according to the first embodiment. FIG. 6 shows the internal structure of the baseband processor 602 shown in FIG. 5, function blocks (an RFIC 603, a main memory 604, an audio IC 610, a microphone 611, and a speaker 612) around the baseband processor 602, and the bus 50.

As shown in FIG. 6, the baseband processor 602 according to the first embodiment includes a DSP (Digital Signal Processor) 11, a cache control unit 12, a post-processor (voice processing unit) 13, and a modem 14. Here, the cache control unit 12 includes a cache memory 12a. Further, the DSP 11 includes a prefetch request unit 11a.

The DSP 11 performs a vocoder process to voice data to be transmitted and voice data received, based on the program data for a vocoder process (part of the entire program stored in the main memory 604) retained in the cache memory 12a. That is, the DSP 11 receives transmission voice data from the post-processor 13 and performs an encoding process to the received transmission voice data, and transmits the encoded transmission voice data to the modem 14. More specifically, the DSP 11 converts PCM data received from the post-processor 13 into AMR data through an encoding process, and transmits the converted PCM data to the modem 14.

On the other hand, the DSP 11 receives demodulated reception voice data from the modem 14 and performs a decoding process to the received reception voice data, and transmits the decoded reception voice data to the post-processor 13. More specifically, the DSP 11 converts AMR data received from the modem 14 into PCM data through a decoding process, and transmits the converted data to the post-processor 13.

Here, the DSP 11 alternately executes an encoding process to the transmission voice signal and a decoding process to the reception voice signal at a prescribed cycle time (period). The cycle time is dependent on the length of the radio frame, and is determined to be 20 ms by the 3GPP (Third-Generation Partnership Project). The baseband processor 602 according to the first embodiment includes the prefetch request unit 11a in the DSP 11. The prefetch request unit 11a requests the cache control unit 12 to prefetch at an interval between vocoder processes intermittently executed by the DSP 11.

More specifically, the prefetch request unit 11a requests a prefetch of the program data executed in a vocoder process that follows. For example, in a period after an encoding process is executed and before a decoding process that follows is executed, the prefetch request unit 11a requests the cache control unit 12 to prefetch the program data used for the decoding process. Further, in a period after a decoding process is executed and before an encoding process that follows is executed, the prefetch request unit 11a requests the cache control unit 12 to prefetch the program data used for the encoding process.

In response to the prefetch request from the prefetch request unit 11a, the cache control unit 12 prefetches, via the bus 50, the program data to be executed by the DSP 11 in a vocoder process that follows (i.e., the next-process program data) from the main memory 604. More specifically, when the prefetch request unit 11a requests a prefetch, if the cache control unit 12 does not retain the next-process program data, then the cache control unit 12 prefetches the next-process program data from the main memory 604.

Accordingly, in performing a vocoder process that follows, in principle a cache miss does not occur and, hence, the cache hit rate can be drastically improved. Therefore, the DSP 11 can execute the vocoder process at high speeds. Note that, if the cache control unit 12 already has the next-process program data when the prefetch request unit 11a requests a prefetch, then it is not necessary to prefetch the next-process program data from the main memory 604.

Further, the program data to be executed by the DSP 11 in a vocoder process that follows is prefetched for each time. In other words, the program data stored in the cache memory 12a is successively rewritten to the program data to be executed by the DSP 11 in a vocoder process that follows.

Accordingly, the cache memory 12a is only required to be capable of retaining program data required for each vocoder process and, hence, the capacity of the cache memory 12a can be reduced. As a result, the baseband processor 602 can be reduced in size. The capacity of the cache memory 12a may be, for example, 64 kB (kilobytes), which is the sum of a 32 kB capacity of an instruction cache and a 32 kB capacity of a data cache. From the viewpoint of miniaturization, the capacity of the cache memory 12a is preferably 100 kB or less.

Note that the cache memory 12a is made up of the instruction cache in which program data is stored and the data cache in which data to be processed is stored. Here, the instruction cache corresponds to the ROM 26 shown in FIG. 1. Further, the data cache corresponds to the internal memory 25 shown in FIG. 1.

The post-processor 13 performs sound quality improvement processing (voice processing) such as noise cancellation, echo cancellation and the like to PCM data received from the audio IC 610, and transmits the processed PCM data to the DSP 11. On the other hand, the post-processor 13 performs sound quality improvement processing (voice processing) such as noise cancellation, echo cancellation and the like to PCM data received from the DSP 11, and transmits the processed PCM data to the audio IC 610.

The modem 14 performs a modulation process and a demodulation process to data to be transmitted and received by the baseband processor 602.

The modem 14 performs a modulation process to transmission voice data (AMR data) received from the DSP 11 through carrier waves, and transmits the modulated transmission voice data to the RFIC 603.

On the other hand, the modem 14 performs a demodulation process to reception voice data (AMR data) received from the RFIC 603 through carrier waves, and transmits the demodulated reception voice data to the DSP 11.

<Comparison with Comparative Examples as to Structure>

Here, the baseband processor 602 according to the first comparative example shown in FIG. 1 includes the internal memory 25 and the ROM 26. In contrast, the baseband processor 602 according to the present embodiment shown in FIG. 6 includes the cache control unit 12 (cache memory 12a) in place of the internal memory 25 and the ROM 26.

While the capacity of about 500 kB, which is the sum of the capacity of the internal memory 25 and that of the ROM 26, is involved with the first comparative example, the capacity of the cache memory 12a according to the present embodiment is, for example, 64 kB, being approximately 1/10 as great as that in the first comparative example. Accordingly, the baseband processor 602 according to the present embodiment can be greatly reduced in size as compared to the first comparative example.

Further, with the baseband processor 602 according to the first comparative example, since the program for a vocoder process is stored in the ROM 26, the program cannot be changed. On the other hand, with the baseband processor 602 according to the present embodiment, since the program for a vocoder process is stored in the rewritable main memory 604, the program can be changed. Further, the large-capacity main memory 604 can be efficiently used.

Further, while the baseband processor 602 according to the second comparative example shown in FIG. 2 does not include a prefetch request unit in the DSP 31, the baseband processor 602 according to the first embodiment shown in FIG. 6 includes the prefetch request unit 11a in the DSP 11. The prefetch request unit 11a requests the cache control unit 12 to prefetch between vocoder processes intermittently executed by the DSP 11.

The cache control unit 12 prefetches the program data to be executed by the DSP 11 in a vocoder process that follows from the main memory 604, in response to the prefetch request from the prefetch request unit 11a. Accordingly, in performing the vocoder process that follows, in principle a cache miss does not occur and, hence, the cache hit rate can be drastically improved as compared to the second comparative example. According the DSP 11 can execute the vocoder process at fast speeds.

As described above, with the semiconductor device according to the present embodiment, the problems associated with the first and second comparative examples can be solved at the same time. That is, both a reduction in size of the semiconductor device and an increase in speed of each vocoder process can be achieved. Specifically, the semiconductor device according to the present embodiment can improve the cache hit rate (reduce the cache miss rate) by including the prefetch request unit in the DSP, despite the fact that miniaturization is achieved by employing the cache memory similarly to the second comparative example.

<Operation of Semiconductor Device According to First Embodiment>

Figure 7:
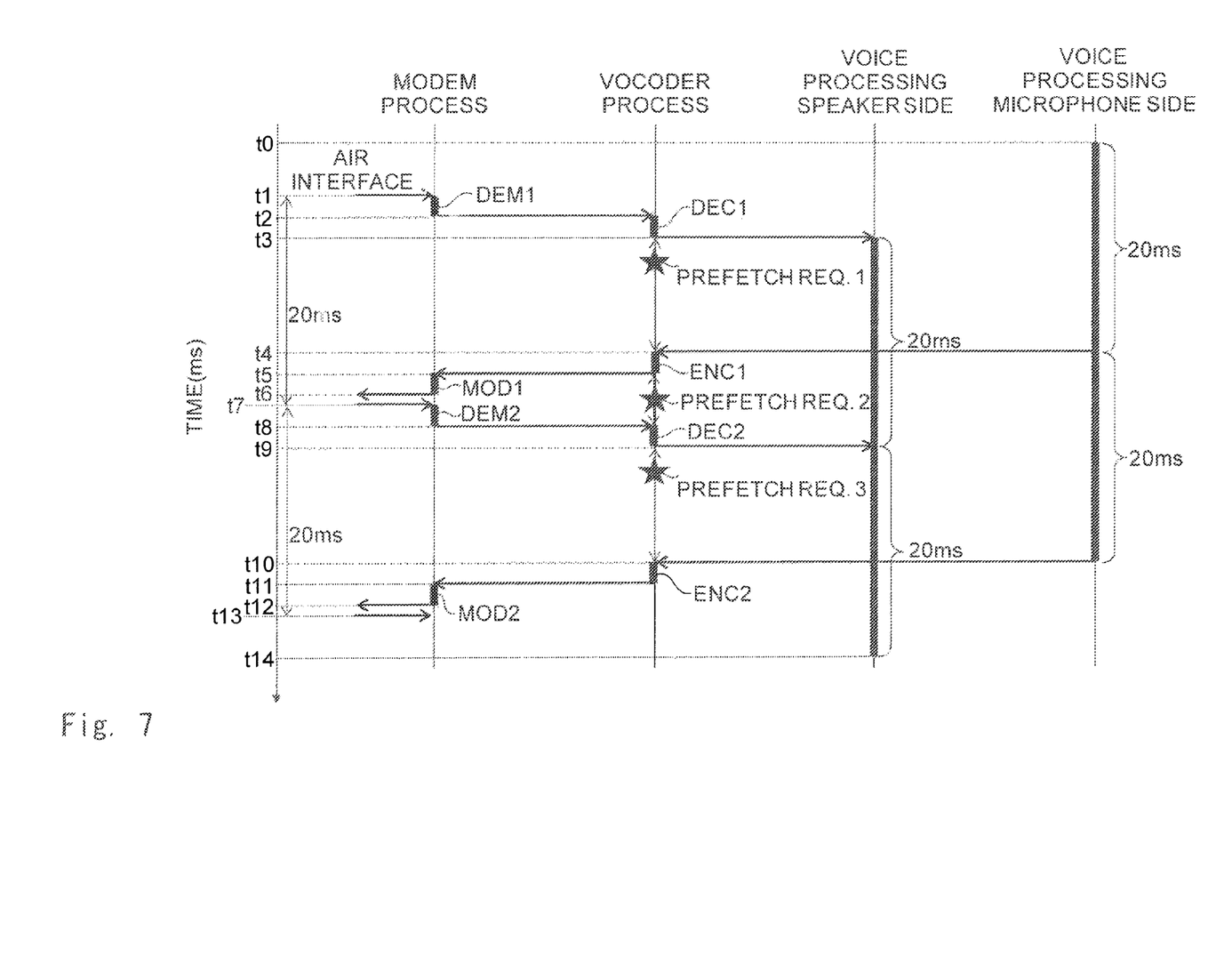
FIG. 7 is a timing chart for explaining the operation of the semiconductor device according to the first embodiment.

With reference to the timing chart of FIG. 7, an explanation will be given of the operation of the semiconductor device according to the present embodiment shown in FIG. 6. FIG. 7 is a timing chart for explaining the operation of the semiconductor device according to the first embodiment. The vertical axis shown in the very left side in FIG. 7 indicates time (ms). In the drawing, time elapses from the top side toward the bottom side. Further, four vertical lines being parallel to the vertical axis (time axis) indicate four processes, namely, a modem process, a vocoder process, voice processing (speaker side), and voice processing (microphone side), in order from the left side in the drawing. Further, single-headed arrows in the drawing represent flows of data. Double-headed arrows represent time sections.

As shown in FIG. 7, in the cycle time of, e.g., 20 ms, decoding of the reception voice signal and encoding of the transmission voice signal are executed.

Firstly, the first cycle (time points t1 to t7) will be explained.

At time point t1, the modem 14 receives a reception voice signal (AMR data) from the air interface.

Between time points t1 and t2, the modem 14 executes a first demodulation process DEM1 to the reception voice signal (AMR data) ("MODEM PROCESS" in FIG. 7).

At time point t2, the DSP 11 receives the reception voice signal (AMR data) demodulated by the modem 14.

Between time points t2 and t3, the DSP 11 executes a first decoding process DEC1 (the first vocoder process) ("VOCODER PROCESS" in FIG. 7). By the first decoding process DEC1, the reception voice signal is converted from AMR data into PCM data.

At time point t3, the post-processor 13 receives the reception voice signal (PCM data) decoded by the DSP 11.

Between time points t3 and t9 spanning 20 ms, the post-processor 13 executes sound quality improvement processing (voice processing) such as noise cancellation, echo cancellation and the like to the reception voice signal (PCM data) ("VOICE PROCESSING SPEAKER SIDE" in FIG. 7). The reception voice signal (PCM data) having undergone the voice processing is transmitted to the speaker 612 via the audio IC 610.

On the other hand, between time points t0 and t4 spanning 20 ms, the post-processor 13 executes sound quality improvement processing (voice processing) such as noise cancellation, echo cancellation and the like to a transmission voice signal (PCM data) ("VOICE PROCESSING MICROPHONE SIDE" in FIG. 7). Note that the transmission voice signal (PCM data) is generated by the audio IC 610 from the voice detected by the microphone 611.

At time point t4, the DSP 11 receives the transmission voice signal (PCM data) having been subjected to the voice processing by the post-processor 13.

Between time points t4 and t5, the DSP 11 executes a first encoding process ENC1 (the second vocoder process) ("VOCODER PROCESS" in FIG. 7). By the first encoding process ENC1, the transmission voice signal is converted from PCM data to AMR data.

At time point t5, the modem 14 receives the transmission voice signal (AMR data) encoded by the DSP 11.

Between time points t5 and t6, the modem 14 executes a first modulation process MOD1 to the transmission voice signal (AMR data) ("MODEM PROCESS" in FIG. 7).

At time point t6, the transmission voice signal (AMR data) modulated by the modem 14 is transmitted to the air interface.

Then, at time point t7, the modem 14 again receives a reception voice signal (AMR data) from the air interface. In this manner, the procedure from time points t1 to t7 (cycle time 20 ms) is repetitively executed.

In order to facilitate the understanding of the present invention, an explanation will be also given of the second cycle (time points t7 to t13). In the second cycle, the processes similar to those in the first cycle are executed.

Specifically, between time points t7 and t8, the modem 14 executes a second demodulation process DEM2 to the reception voice signal (AMR data) ("MODEM PROCESS" in FIG. 7).

At time point t8, the DSP 11 receives the reception voice signal (AMR data) demodulated by the modem 14.

Between time points t8 and t9, the DSP 11 executes a second decoding process DEC2 (the third vocoder process) ("VOCODER PROCESS" in FIG. 7). By the second decoding process DEC2, the reception voice signal is converted from AMR data into PCM data.

At time point t9, the post-processor 13 receives the reception voice signal (PCM data) decoded by the DSP 11.

Between time points t9 and t14 spanning 20 ms, the post-processor 13 executes sound quality improvement processing (voice processing) such as noise cancellation, echo cancellation and the like to the reception voice signal (PCM data) ("VOICE PROCESSING SPEAKER SIDE" in FIG. 7). The reception voice signal (PCM data) having undergone the voice processing is transmitted to the speaker 612 via the audio IC 610.

On the other hand, between time points t4 and t10 spanning 20 ms, the post-processor 13 executes sound quality improvement processing (voice processing) such as noise cancellation, echo cancellation and the like to a transmission voice signal (PCM data) ("VOICE PROCESSING MICROPHONE SIDE" in FIG. 7).

At time point t10, the DSP 11 receives the transmission voice signal (PCM data) having been subjected to the voice processing by the post-processor 13.

Between time points t10 and t11, the DSP 11 executes a second encoding process ENC2 (the fourth vocoder process) ("VOCODER PROCESS" in FIG. 7). By the second encoding process ENC2, the transmission voice signal is converted from PCM data to AMR data.

At time point t11, the modem 14 receives the transmission voice signal (AMR data) encoded by the DSP 11.

Between time points t11 and t12, the modem 14 executes a second modulation process MOD2 to the transmission voice signal (AMR data) ("MODEM PROCESS" in FIG. 7)

At time point t12, the transmission voice signal (AMR data) modulated by the modem 14 is transmitted to the air interface.

Then, at time point t13, further again the modem 14 receives a reception voice signal (AMR data) from the air interface.

Here, as shown in "VOCODER PROCESS" in FIG. 7, the decoding processes (DEC1, DEC2 and others) and the encoding processes (ENC1, ENC2 and the like) are repeatedly executed alternately. Further, the processes are executed intermittently. Specifically, in FIG. 7, after the first decoding process DEC1 between time points t2 and t3 is executed, the first encoding process ENC1 between time points t4 and t5 is executed after a lapse of a period from time points t3 to t4. Further, after the first encoding process ENC1, the second decoding process DEC2 between time points t8 and t9 is executed after a lapse of a period from time points t5 to t8. Further, after the second decoding process DEC2, the second encoding process ENC2 between time points t10 and t11 is executed after a lapse of a period from time points t9 to t10.

In this manner, the VOCODER process (the decoding process and the encoding process) is intermittently executed by the DSP 11. Using such a characteristic of the VOCODER process, with the semiconductor device according to the present embodiment, between a decoding process and an encoding process being adjacent to each other, the DSP 11 requests the cache control unit 12 to prefetch program data to be used in the process that follows. The prefetch requests (PREFERCH REQ.1 and others) are represented by stars in FIG. 7.

Specifically, after the DSP 11 executes the first decoding process DEC1 (the first vocoder process), in a period (time points t3 to t4) before executing the first encoding process ENC1 (the second vocoder process), the DSP 11 outputs, from the prefetch request unit 11a to the cache control unit 12, the first prefetch request (PREFERCH REQ.1) for requesting a prefetch of the program data for the first encoding process ENC1 (the second vocoder process).

Further, after the DSP 11 executes the first encoding process ENC1 (the second vocoder process), in a period (time points t5 to t8) before executing the second decoding process DEC2 (the third vocoder process), the DSP 11 outputs, from the prefetch request unit 11a to the cache control unit 12, the second prefetch request (PREFERCH REQ.2) for requesting a prefetch of the program data for the second decoding process DEC2 (the third vocoder process).

Further, after the DSP 11 executes the second decoding process DEC2 (the third vocoder process), in a period (time points t9 to t10) before executing the second encoding process ENC2 (the fourth vocoder process), the DSP 11 outputs, from the prefetch request unit 11a to the cache control unit 12, the third prefetch request (PREFERCH REQ.3) for requesting a prefetch of the program data for the second encoding process ENC2 (the fourth vocoder process).

<Comparison to Comparative Examples as to Operation>

Here, with the semiconductor device according to the second comparative example shown in FIG. 2, since the DSP 31 does not include a prefetch request unit, as shown in FIG. 3, the DSP 31 cannot request, in the period between a decoding process and an encoding process being adjacent to each other, the cache control unit 12 to prefetch the program data to be used in the process that follows. Accordingly, a cache miss tends to occur, and any vocoder process executed by the DSP 31 may possibly delay.

In contrast, with the baseband processor 602 according to the first embodiment shown in FIG. 6, the DSP 11 includes the prefetch request unit 11a. The prefetch request unit 11a requests the cache control unit 12 to prefetch between vocoder processes intermittently executed by the DSP 11. The cache control unit 12 prefetches from the main memory 604 the program data to be executed by the DSP 11 in a vocoder process that follows, in response to any prefetch request (PREFERCH REQ.1 and others) from the prefetch request unit 11*a*. Accordingly, in performing the vocoder process that follows (one of a decoding process and an encoding process), in principle a cache miss does not occur and, hence, the cache hit rate can be drastically improved as compared to the second comparative example. Accordingly, the DSP 11 can execute the vocoder process at fast speeds.

Further, as can be also seen from the prefetch requests (PREFERCH REQ.1 and others) shown in FIG. 7, the program data to be executed by the DSP 11 in a vocoder process that follows is prefetched for each time. In other words, the program data stored in the cache memory 12*a* is successively rewritten to the program data to be executed by the DSP 11 in the vocoder process that follows. Accordingly, the cache memory 12*a* is only required to be capable of retaining program data required for each vocoder process and, hence, the capacity of the cache memory 12*a* can be reduced. As a result, the baseband processor 602 can be reduced in size.

<Variations>

In the foregoing, while the invention made by the inventors has been specifically explained based on the embodiments, it goes without saying that the present invention is not limited to the above-described embodiments, and that various modifications can be made within the range not departing from the gist of the present invention.

For example, though the baseband processor 602 executes the vocoder process in the embodiments described above, the application processor 601 may execute the vocoder process.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A vocoder processing method for an electronic device including a vocoder processing unit with a prefetch request unit that alternately encodes a transmission voice signal and decodes a reception voice signal repetitively at a prescribed cycle time, a memory that stores a decoding program and an encoding program, and a cache memory that temporarily retains decoding program data and encoding program data, the method comprising:
   executing, by the vocoder processing unit, a first vocoder process;
   after executing the first vocoder process and before executing a second vocoder process, requesting, by the prefetch request unit, the cache memory to prefetch program data for the second vocoder process from the memory;
   executing the second vocoder process at the prescribed cycle time;
   when the first vocoder process decodes the reception voice signal, the second vocoder process encodes the transmission voice signal and the prefetched program data is the encoding program data; and
   when the first vocoder process encodes the transmission voice signal, the second vocoder process decodes the reception voice signal and the prefetched program data is the decoding program data.

2. The vocoder processing method according to claim 1, wherein, when the prefetch request unit requests the cache memory to prefetch the program data, the cache memory prefetches the program data from the memory if the program data is absent in the cache memory.

3. The vocoder processing method according to claim 1, wherein, after the vocoder processing unit executes the second vocoder process and before the vocoder processing unit executes a following third vocoder process, the prefetch request unit requests the cache memory to prefetch program data for the third vocoder process from the memory.

4. The vocoder processing method according to claim 3, wherein, when the prefetch request unit requests the cache memory to prefetch the program data, the cache memory prefetches the program data from the memory if the program data is absent in the cache memory.

5. The vocoder processing method according to claim 1, wherein the cache memory has a capacity of 100 kilobytes or less.

6. The vocoder processing method according to claim 1, wherein the memory is rewritable.

7. The vocoder processing method according to claim 6, wherein the memory is a DRAM.

8. A semiconductor device, comprising:
   a vocoder processing unit, including a prefetch request unit, that alternately encodes a transmission voice signal and decodes a reception voice signal repetitively at a prescribed cycle time; and
   a cache memory that temporarily retains decoding program data and encoding program data, the decoding and encoding program data being stored in an external memory,
   wherein, after the vocoder processing unit executes a first vocoder process and before the vocoder processing unit executes a second vocoder process, the prefetch request unit requests the cache memory to prefetch program data for the second vocoder process from the external memory,
   wherein, when the first vocoder process decodes the reception voice signal, the second vocoder process encodes the transmission voice signal and the prefetched program data is the encoding program data, and
   wherein, when the first vocoder process encodes the transmission voice signal, the second vocoder process decodes the reception voice signal and the prefetched program data is the decoding program data.

9. The semiconductor device according to claim 8, wherein, when the prefetch request unit requests the cache memory to prefetch the program data, the cache memory prefetches the program data from the external memory if the program data is absent in the cache memory.

10. The semiconductor device according to claim 8, wherein, after the vocoder processing unit executes the second vocoder process and before the vocoder processing unit executes a following third vocoder process, the prefetch request unit requests the cache memory to prefetch program data for the third vocoder process from the external memory.

11. The semiconductor device according to claim 10, wherein, when the prefetch request unit requests the cache memory to prefetch the program data, the cache memory prefetches the program data from the external memory if the program data is absent in the cache memory.

12. The semiconductor device according to claim 8, wherein the cache memory has a capacity of 100 kilobytes or less.

13. The semiconductor device according to claim 8, further comprising a modem that executes a modulation process to the transmission voice signal after encoding, and a demodulation process to the reception voice signal before decoding.

14. An electronic device, comprising:
- a vocoder processing unit, including a prefetch request unit, that alternately encodes a transmission voice signal and decodes a reception voice signal repetitively at a prescribed cycle time;
- a memory that stores a decoding program and an encoding program; and
- a cache memory that temporarily retains decoding program data and encoding program data, wherein, after the vocoder processing unit executes a first vocoder process and before the vocoder processing unit executes a second vocoder process, the prefetch request unit requests the cache memory to prefetch program data for the second vocoder process from the memory, wherein, when the first vocoder process decodes the reception voice signal, the second vocoder process encodes the transmission voice signal and the prefetched program data is the encoding program data, and wherein, when the first vocoder process encodes the transmission voice signal, the second vocoder process decodes the reception voice signal and the prefetched program data is the decoding program data.

15. The electronic device according to claim 14, wherein, when the prefetch request unit requests the cache memory to prefetch the program data, the cache memory prefetches the program data from the memory if the program data is absent in the cache memory.

16. The electronic device according to claim 14, wherein, after the vocoder processing unit executes the second vocoder process and before the vocoder processing unit executes a following third vocoder process, the prefetch request unit requests the cache memory to prefetch program data for the third vocoder process from the memory.

17. The electronic device according to claim 16, wherein, when the prefetch request unit requests the cache memory to prefetch the program data, the cache memory prefetches the program data from the memory if the program data is absent in the cache memory.

18. The electronic device according to claim 14, wherein the cache memory has a capacity of 100 kilobytes or less.

19. The electronic device according to claim 14, wherein the memory is rewritable.

20. The electronic device according to claim 19, wherein the memory is a DRAM.

* * * * *